(12) United States Patent
Satomi et al.

(10) Patent No.: US 12,386,571 B2
(45) Date of Patent: Aug. 12, 2025

(54) IMAGE FORMING DEVICE AND IMAGE FORMING METHOD

(71) Applicant: SEIKO EPSON CORPORATION, Tokyo (JP)

(72) Inventors: Akihiko Satomi, Shiojiri (JP); Yasuhiro Oshima, Matsumoto (JP); Yasuhiro Furuta, Shimosuwa-machi (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 18/393,749

(22) Filed: Dec. 22, 2023

(65) Prior Publication Data

US 2024/0211191 A1   Jun. 27, 2024

(30) Foreign Application Priority Data

Dec. 26, 2022   (JP) ................................. 2022-207950

(51) Int. Cl.
*G06F 3/12*   (2006.01)
*H04N 1/34*   (2006.01)

(52) U.S. Cl.
CPC .......... *G06F 3/1247* (2013.01); *G06F 3/1203* (2013.01); *G06F 3/1267* (2013.01); *H04N 1/34* (2013.01); *G06F 3/1204* (2013.01)

(58) Field of Classification Search
USPC ....................................................... 358/1.15
See application file for complete search history.

(56) References Cited

U.S. PATENT DOCUMENTS

2019/0278535 A1* 9/2019 Choi ..................... G06F 3/1217
2022/0043614 A1* 2/2022 Dozen ................... G06F 3/1286
2022/0291885 A1* 9/2022 Shibata ................. G06F 3/1285

FOREIGN PATENT DOCUMENTS

JP           2015056168 A        3/2015

* cited by examiner

*Primary Examiner* — Darryl V Dottin
(74) *Attorney, Agent, or Firm* — CHIP LAW GROUP

(57) ABSTRACT

An image forming device according to an aspect of the present disclosure provides a terminal device with an operation image, acquires a first file to be printed from the terminal device, generates the first identification information that is identification information for approving printing of the first file to be printed, and stores a first object to be printed that is first print data obtained by converting the first file to be printed or the first file to be printed and the first identification information in association with each other. The image forming device notifies the terminal device of the first identification information, receives input of the identification information, identifies the first object to be printed corresponding to the first identification information when the identification information whose input is received matches the first identification information, and executes printing of the first print data of the identified first object to be printed.

12 Claims, 10 Drawing Sheets

IMAGE FORMING DEVICE AND IMAGE FORMING METHOD

The present application is based on, and claims priority from JP Application Serial Number 2022-207950, filed Dec. 26, 2022, the disclosure of which is hereby incorporated by reference herein in its entirety.

BACKGROUND

1. Technical Field

The present disclosure relates to an image forming device, an image forming method, and a non-transitory computer-readable storage medium storing an image forming process program.

2. Related Art

An image forming device such as a multifunction machine is installed at a flexible office, a third place, and the like. In this image forming device, a print job received from a client device such as a personal computer (PC) and stored in the server device can be printed by the user entering job identification information such as a PIN code. PIN is an abbreviation for a personal identification number.

For example, JP-A-2015-56168 discloses an output system in which a terminal device, an output device, and an information processing device are connected via a network for the purpose of ensuring uniqueness of job identification information without increasing the number of digits of the job identification information. The output system manages the job data and the first identification information in association with each other, and transmits to the terminal device a request for an acquisition of the second identification information that designates a specific job uniquely identified by the first identification information according to entry of the job using a response that a user can instruct. The output system transmits the second identification information to the terminal device based on the request for an acquisition of the second identification information using the response, and based on the job data output request using the second identification information received by the output device, transmits to the output device the data of the job associated with the second identification information.

However, in the output system described in JP-A-2015-56168, when an image forming device is applied as an output device, the process necessary for the user to print the file to be printed after approval by the output system is complicated.

Therefore, it is desired to develop a system that can be used in flexible offices, third places, and the like, with simpler processing for a system that can request printing from a terminal device to an image forming device and perform printing after approval by the image forming device.

SUMMARY

According to an aspect of the present disclosure, an image forming device includes a providing unit that provides a terminal device with an operation image, an acquisition unit that acquires a first file to be printed from the terminal device, a generation unit that generates first identification information that is identification information for approving printing of the first file to be printed, a conversion unit that converts the first file to be printed into first print data, a storage unit that stores a first object to be printed that is either one of the first file to be printed and the first print data, and the first identification information in association with each other, a notification unit that notifies the terminal device of the first identification information stored in the storage unit, an input unit that receives input of identification information, an identification unit that identifies the first object to be printed corresponding to the first identification information when the identification information whose input is received by the input unit matches the first identification information, and a printing unit that executes printing of the first print data of the first object to be printed identified by the identification unit.

According to another aspect of the present disclosure, an image forming method includes the image forming device providing a terminal device with an operation image, acquiring a first file to be printed from the terminal device, generating first identification information that is identification information for approving printing of the first file to be printed, converting the first file to be printed into first print data, storing a first object to be printed that is either one of the first file to be printed and the first print data, and the first identification information in association with each other, notifying the terminal device of the first identification information stored, receiving input of identification information, identifying the first object to be printed corresponding to the first identification information when the identification information whose input is received matches the first identification information, and executing printing of the first print data of the first object to be printed identified.

According to still another aspect of the present disclosure, in a non-transitory computer-readable storage medium storing an image forming process program, the program causes a computer included in an image forming device to execute providing a terminal device with an operation image, acquiring a first file to be printed from the terminal device, generating first identification information that is identification information for approving printing of the first file to be printed, converting the first file to be printed into first print data, storing a first object to be printed that is either one of the first file to be printed and the first print data, and the first identification information in association with each other, notifying the terminal device of the first identification information stored, receiving input of identification information, identifying the first object to be printed corresponding to the first identification information when the identification information whose input is received matches the first identification information, and executing printing of the first print data of the first object to be printed identified.

DESCRIPTION OF EMBODIMENTS

Hereinafter, embodiments of the present disclosure will be described with reference to the drawings. Each drawing is merely an example for describing the present embodiment of the present disclosure. Moreover, not all of the constituent elements described in the present embodiments of the present disclosure are essential constituent elements of the present disclosure.

Embodiments

Figure 1:
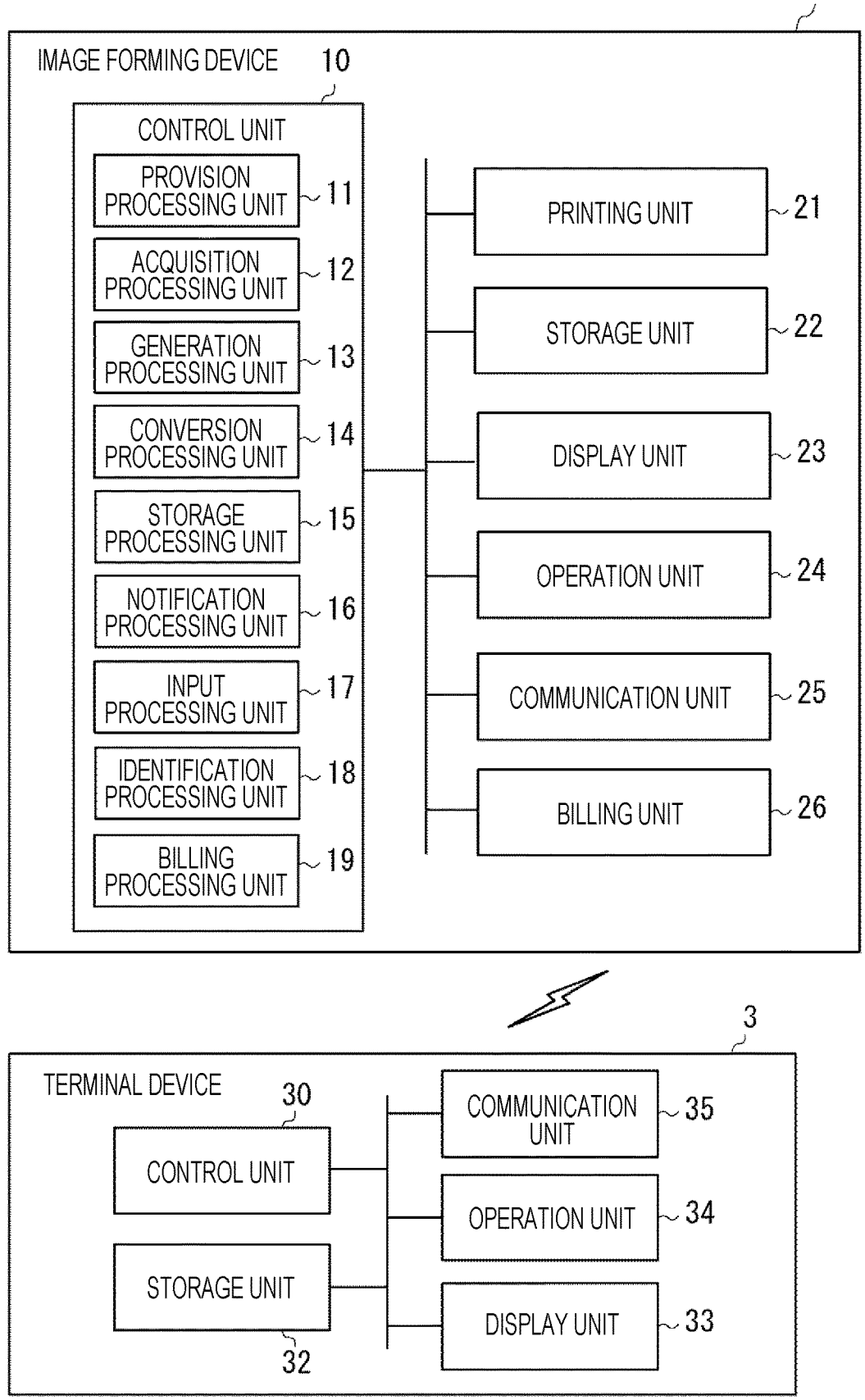
FIG. 1 is a block diagram showing an example of an image forming system including an image forming device according to an embodiment.
Figure 2:
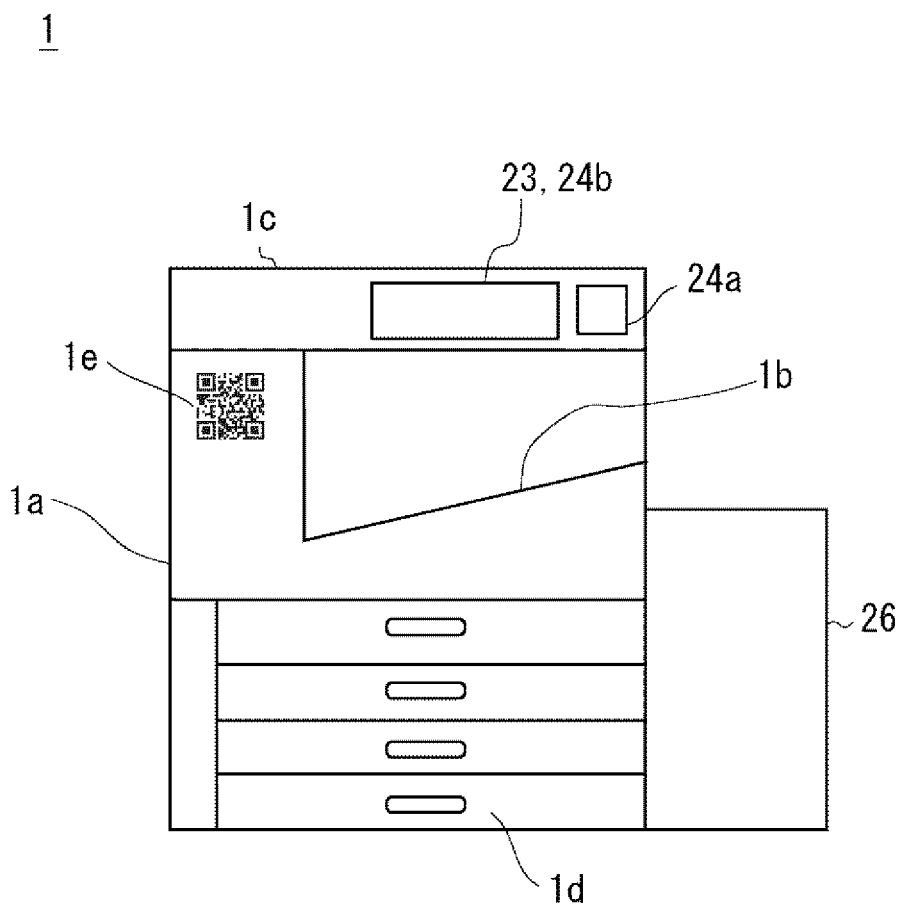
FIG. 2 is a front view showing an example of the appearance of the image forming device of FIG. 1.

FIG. 1 is a block diagram showing an example of an image forming system including an image forming device according to an embodiment. FIG. 2 is a front view showing an example of the appearance of the image forming device in the image forming system of FIG. 1.

As shown in FIG. 1, the image forming system according to the present embodiment (hereinafter referred to as a present system) includes an image forming device 1 and a terminal device 3. The present system is a system that requests printing from the terminal device 3 to the image forming device 1 and performs printing after approval by the image forming device 1.

Schematic Configuration of Image Forming Device 1

The image forming device 1 can include a control unit 10, a printing unit 21, a storage unit 22, a display unit 23, an operation unit 24, a communication unit 25, and a billing unit 26, as shown in FIG. 1. As shown in the appearance in FIG. 2, the image forming device 1 can include, for example, a main body 1a including a paper discharge portion 1b and a paper feed box 1d, and a document pressing unit 1c including a document cover and an automatic document feeder as well as the display unit 23 and an operation unit, and the billing unit 26.

The control unit 10 of the image forming device 1 can be referred to as a controller, and controls the entire image forming device 1. Although the details will be described later, the control unit 10 can include a provision processing unit 11, an acquisition processing unit 12, a generation processing unit 13, a conversion processing unit 14, a storage processing unit 15, a notification processing unit 16, an input processing unit 17, and an identification processing unit 18 and a billing processing unit 19.

The control unit 10 can include, for example, an arithmetic processing unit such as a central processing unit (CPU) and a graphics processing unit (GPU), a working memory, and a storage device that stores a control program, a parameter, and the like. The control unit 10 can be configured as a system on a chip (SoC). As can be seen from these examples, the control unit 10 can be a configuration that stores a control program in an executable state. The control unit 10 can be a configuration that stores a control program as a circuit configuration such as a field-programmable gate array (FPGA), or can be a configuration as a dedicated circuit. The provision processing unit 11, the acquisition processing unit 12, the generation processing unit 13, the conversion processing unit 14, the storage processing unit 15, the notification processing unit 16, the input processing unit 17, the identification processing unit 18, and the billing processing unit 19 are implemented as the above program. The above program may include a program for implementing the functions of the units 11 to 19 while cooperating with the printing unit 21, the storage unit 22, the display unit 23, the operation unit 24, the communication unit 25, and the billing unit 26.

The printing unit 21 executes printing on a medium based on the print data, and forms an image indicated by the print data on the medium. Various printing methods such as an ink jet printing method and a laser printing method can be applied in the printing method in the printing unit 21. The image forming device 1 can be referred to as an ink jet printer when adopting an ink jet printing method, and can be referred to as a laser printer when adopting a laser printing method.

The storage unit 22 includes, for example, a hard disk drive, a solid state drive, or another memory storage device. Part of the memory included in the control unit 10 may be regarded as the storage unit 22. The storage unit 22 can be regarded as part of the control unit 10.

The display unit 23 is a part for displaying information, and is configured by a display device such as a liquid crystal display, an organic EL display, or the like. The display unit 23 can include a display and a drive circuit for driving the display.

The operation unit 24 is a part that receives user operations and inputs, and can also be referred to as an operation reception unit. The operation unit 24 can be implemented by, for example, any one or a plurality of a physical button, a touch panel mounted on the display unit 23, a pointing device, a keyboard, and the like. FIG. 2 shows an example in which the operation unit 24 is configured by a physical button group 24a that is a set of physical buttons, and a touch panel 24b. A configuration in which the operation unit 24 includes the touch panel 24b can be referred to as an operation panel of the image forming device 1 including the display unit 23 and the touch panel 24b.

The communication unit 25 can be one or a plurality of communication interfaces for the image forming device 1 to perform wired or wireless communication with one or a plurality of external devices in accordance with a predetermined communication protocol including a predetermined communication standard. This external device is, for example, a device having a communication function such as a personal computer (PC), a server, a smartphone, a tablet terminal, or the like. The communication unit 25 can receive print data that is data in a format that can be printed by the printing unit 21 from an external device. In this case, image forming device 1 can print the print data on a medium. This external device can perform various settings related to printing in the image forming device 1.

The terminal device 3 is one external device, and in the present embodiment, it is assumed that the terminal device 3 transmits a file to be printed that is an object to be printed to the image forming device 1 as will be described later. In the image forming device 1 that has received the file to be printed, the conversion processing unit 14 of the control unit 10 converts the file into print data that is data in a format that can be printed by the printing unit 21, and the printing unit 21 prints the converted print data on a medium.

The billing unit 26 can include a billing device called a coin vendor or the like, and can have a function of executing billing with electronic money or the like via the communication unit 25. The billing unit 26 can be disposed, for example, on the side face of the main body 1a of the image forming device 1, as shown in FIG. 2.

Schematic Configuration of Terminal Device 3

The terminal device 3 can be a device having a communication function such as a smartphone, a tablet terminal, or a PC. The terminal device 3 can include a control unit 30, a storage unit 32, a display unit 33, an operation unit 34, and a communication unit 35.

The control unit 30 of the terminal device 3 can be referred to as a controller, and controls the entire terminal device 3. The control unit 30 can include, for example, an arithmetic processing unit such as a CPU or GPU, a working memory, and a storage device that stores a control program, a parameter, and the like. The control unit 30 can be configured as an SoC. As can be seen from these examples, the control unit 30 can be a configuration that stores a control program in an executable state. The control unit 30 can be a configuration that stores a control program as a circuit configuration such as an FPGA, or may be a configuration as a dedicated circuit. The above program can be a program for implementing the functions of the terminal device 3 while cooperating with the storage unit 32, the display unit 33, the operation unit 34, and the communication unit 35.

The storage unit 32 includes, for example, a hard disk drive, a solid state drive, or another memory storage device. Part of the memory included in the control unit 30 may be regarded as the storage unit 32. The storage unit 32 can be regarded as part of the control unit 30.

The display unit 33 is a part for displaying information, and is configured by a display device such as a liquid crystal display, an organic EL display, or the like. The display unit 33 can include a display and a drive circuit for driving the display.

The operation unit 34 is a part that receives user operations and inputs, and can also be referred to as an operation reception unit. The operation unit 34 can be implemented by, for example, any one or a plurality of a physical button, a touch panel mounted on the display unit 23, a pointing device, a keyboard, and the like. A configuration in which the operation unit 34 includes a touch panel can be referred to as an operation panel of the terminal device 3 including the display unit 23 and the touch panel.

When the terminal device 3 is a portable terminal device, it is easier to request the image forming device 1 to perform a printing process at the place where the image forming device 1 is installed, so that description is made assuming that the terminal device 3 is a portable terminal device, but it may be a stationary terminal device. When the terminal device 3 is portable, the operation unit 34 can be a touch panel mounted on the display unit 23.

The communication unit 35 may be one or a plurality of communication interfaces for the terminal device 3 to communicate with one or a plurality of external devices in a wired or wireless manner in accordance with a predetermined communication protocol including a predetermined communication standard. At least the image forming device 1 is included as the external device. As described above, as one external device with which the image forming device 1 can communicate, the terminal device 3 can communicate with the image forming device 1, and the communication unit 35 is responsible for this communication. The communication unit 35 can transmit a file to be printed that is a file as an object to be printed to the image forming device 1 and a request for changing various settings related to printing in the image forming device 1.

Specific Configuration of Present System

Details of the control unit 10 of the image forming device 1 will be described together with detailed processing examples of the terminal device 3. In the present system, as a general flow, the image forming device 1 provides the terminal device 3 with an operation image for transmitting a file to be printed to the image forming device 1, and executes printing of the file to be printed that was transmitted to the image forming device 1. In the present system, a print request by transmission of a file to be printed from the terminal device 3 is not received as it is, but printing is executed after approval by the image forming device 1. Hereinafter, transmission of a file to be printed may be referred to as uploading of the file to be printed.

The provision processing unit 11 provides the terminal device 3 with the operation image via the communication unit 25. The provision processing unit 11 and the communication unit 25 can be referred to as a providing unit. The provision processing unit 11 can provide an operation image when receiving a request for an operation image from the terminal device 3 via the communication unit 25.

The operation image is an image for transmitting a file to be printed to the image forming device 1, and is received by the communication unit 35 and displayed on the display unit 33 of the terminal device 3. The operation image can be displayed on the display unit 33 using, for example, a web browser, and in this case, the operation image can also be referred to as a web screen.

As shown in FIG. 2, the image forming device 1 displays a QR code (registered trademark: the same applies hereinafter) 1e indicating the address of the provider of the operation image on the main body 1a or the like, or attaches a sticker with such a QR code 1e displayed, so that it is possible to easily provide the operation image to the user.

The acquisition processing unit 12 acquires the file to be printed from the terminal device 3 via the communication unit 25. The number of files to be printed to be acquired can be one or plural, and for convenience, the file to be printed acquired first will be referred to as a first file to be printed in the description. The acquisition processing unit 12 and the communication unit 25 can be referred to as an acquisition unit. Prior to such acquisition, in the terminal device 3, the user designates a file to be printed from the operation unit 34 to transmit the file to be printed to the image forming device 1 via the communication unit 35.

The generation processing unit 13 generates first identification information that is identification information for approving printing of the first file to be printed. The generation processing unit 13 can be referred to as a generation unit. This first identification information is information used for the image forming device 1 to approve printing of the file to be printed transmitted from the terminal device 3, that is, to determine whether to approve printing. Therefore, this first identification information is different from management information for identifying a print job, such as a so-called print job ID.

Therefore, information that identifies the terminal device 3 or the user of the terminal device 3, such as a PIN, can be used as the first identification information, but the present disclosure is not limited to this. For example, the first identification information may be information including characters, symbols, numbers, and the like generated in any manner as long as it is referred to for determining approve/disapprove of the file to be printed such as the first file to be printed transmitted from the terminal device 3.

The conversion processing unit 14 converts the first file to be printed into first print data that is data in a format that can be printed by the printing unit 21. The conversion processing unit 14 converts the first file to be printed into first print data based on the print setting designated by the terminal device 3 or the operation unit 24 or the default print setting. The print settings can include a color/monochrome difference, the number of copies to print, a print definition, and the like. The conversion processing unit 14 can be referred to as a conversion unit.

The conversion processing unit 14 converts a file to be printed other than the first file to be printed received from the terminal device 3 into print data in a format that can be printed by the printing unit 21. The timing at which the conversion processing unit 14 converts the file to be printed into print data is not limited to the timing at which the file to be printed is received. The timing of the conversion may be any timing before the timing of printing by the printing unit 21, such as the timing after the identification by the identification processing unit 18 or the timing just before printing is executed by the printing unit 21. The conversion processing unit 14 can delete the file to be printed such as the first file to be printed after conversion, or delete the file after being saved for a certain saving period after conversion.

The storage processing unit 15 performs a process of storing, in the storage unit 22, the first object to be printed that is either one of the first file to be printed and the first print data and the first identification information in association with each other. Although depending on the conversion processing procedure by the conversion processing unit 14 and a temporary saving period for the first file to be printed after the conversion process, it is possible to perform the following control when the first print data has been generated at the time of this association. That is, in this case, the storage processing unit 15 can store both the first file to be printed and the first print data in association with the first identification information. The storage processing unit 15 and the storage unit 22 can be referred to as a storage unit.

The notification processing unit 16 notifies the terminal device 3 of the first identification information stored in the storage unit 22 via the communication unit 25. The notification processing unit 16 and the communication unit 25 can be referred to as a notification unit. By updating the operation image so that the provision processing unit 11 includes this notification in the operation image, it is possible to make a notification to the terminal device 3. Alternatively, the notification to the terminal device 3 can be made by urging the input of the notification destination such as a telephone number, an e-mail address, and the like of the terminal device 3 in the operation image and transmitting the message for the notification to the input notification destination. In either case, in the terminal device 3, the notification details including the first identification information can be received by the communication unit 35 and displayed on the display unit 33.

The input processing unit 17 receives input of identification information from the operation unit 24 on the display unit 23. For example, the input processing unit 17 provides an input field for identification information in an operation image displayed on the display unit 23 (hereinafter referred to as a main body operation image), and receives input from the operation unit 24. Since any user can input identification information, an identification processing unit 18, which will be described later, is provided. The input processing unit 17, the display unit 23, and the operation unit 24 can be referred to as an input unit.

When the identification information whose input is received by the input processing unit 17 matches the first identification information stored in the storage unit 22, the identification processing unit 18 identifies the first object to be printed corresponding to the first identification information. In other words, the identification processing unit 18 determines whether the identification information whose input is received by the input processing unit 17 matches the first identification information stored in the storage unit 22, and when they match, identifies the first object to be printed associated with the first identification information. The identification processing unit 18 can be referred to as an identification unit.

The printing unit 21 executes printing of the first print data of the first object to be printed identified by the identification processing unit 18. The first print data of the first object to be printed is the first print data after the first file to be printed has been converted by the conversion processing unit 14, when conversion to the first print data by the conversion processing unit 14 has not yet been performed, and the first print data when the conversion has been completed. Of course, the printing unit 21 can print print data other than the first print data.

Unlike the present embodiment, even when print data that is data in a printable format is received via the communication unit 25, the printing unit 21 can print the print data. In this case, conversion by the conversion processing unit 14 is unnecessary.

The billing processing unit 19 acquires billing completion information indicating that the consideration for printing corresponding to the first identification information was charged by the billing unit 26. Therefore, it can be said that the billing processing unit 19 includes a billing information acquisition unit that acquires such billing completion information. Alternatively, the billing processing unit 19 and the billing unit 26, or the billing processing unit 19, the billing unit 26 and the communication unit 25 can be referred to as a billing information acquisition unit.

The consideration for printing corresponding to the first identification information refers to a consideration required for printing the file to be printed according to the number of pages of the file to be printed associated with the first identification information, a color/monochrome difference, the number of copies to be printed, and other print settings. Other print settings can include a print definition and the like.

The billing unit 26 can execute billing with electronic money, a QR code, or the like via the communication unit 25 as described above. In this case, the billing processing unit 19 can acquire billing completion information via the communication unit 25. The QR code here is different from the QR code 1e indicating the address of the provider of the operation image, and is information indicating a link to the settlement destination system.

In the case of executing billing with electronic money, a QR code, and the like via the communication unit 25, the billing unit 26 can indirectly receive the result of the settlement from the terminal device 3 as billing completion information from the settlement site. Billing can be executed with a prepaid card or the like. In addition, when billing is not completed, the billing processing unit 19 can display a notification urging a payment on the display unit 23, and suspend printing. The billing unit 26 can include an interface for inputting the first identification information. In this case, the billing unit 26 includes some of the functions of the operation unit 24.

The printing unit 21 can execute printing when at least the billing completion information has been acquired. There are cases where no billing is required for the service, and in this case, the billing completion information is unnecessary.

First Example of Upload Printing Process by Present System

Figure 3:
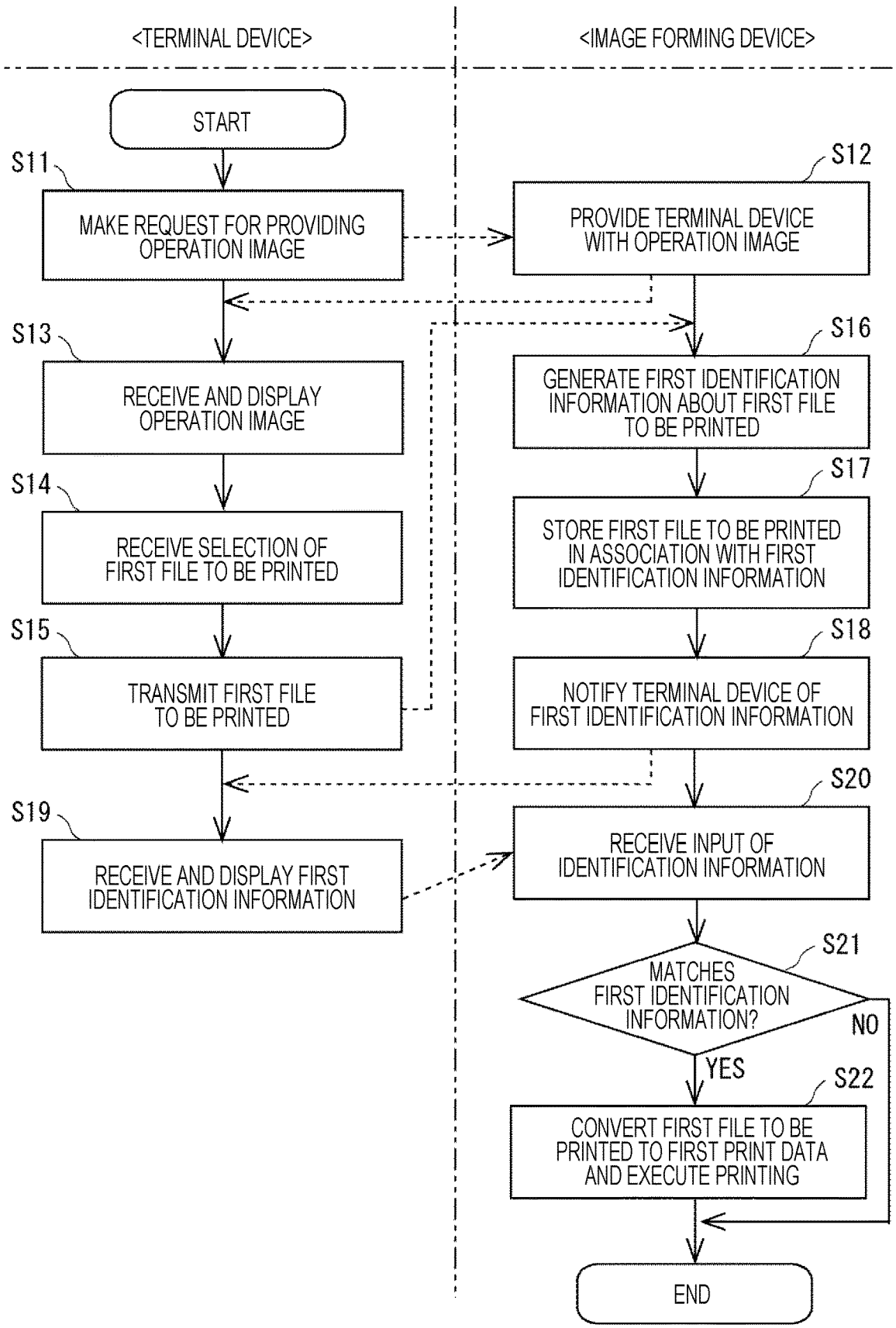
FIG. 3 is a flowchart for explaining a first example of an upload printing process executed by the image forming device of FIG. 1.
Figure 4:
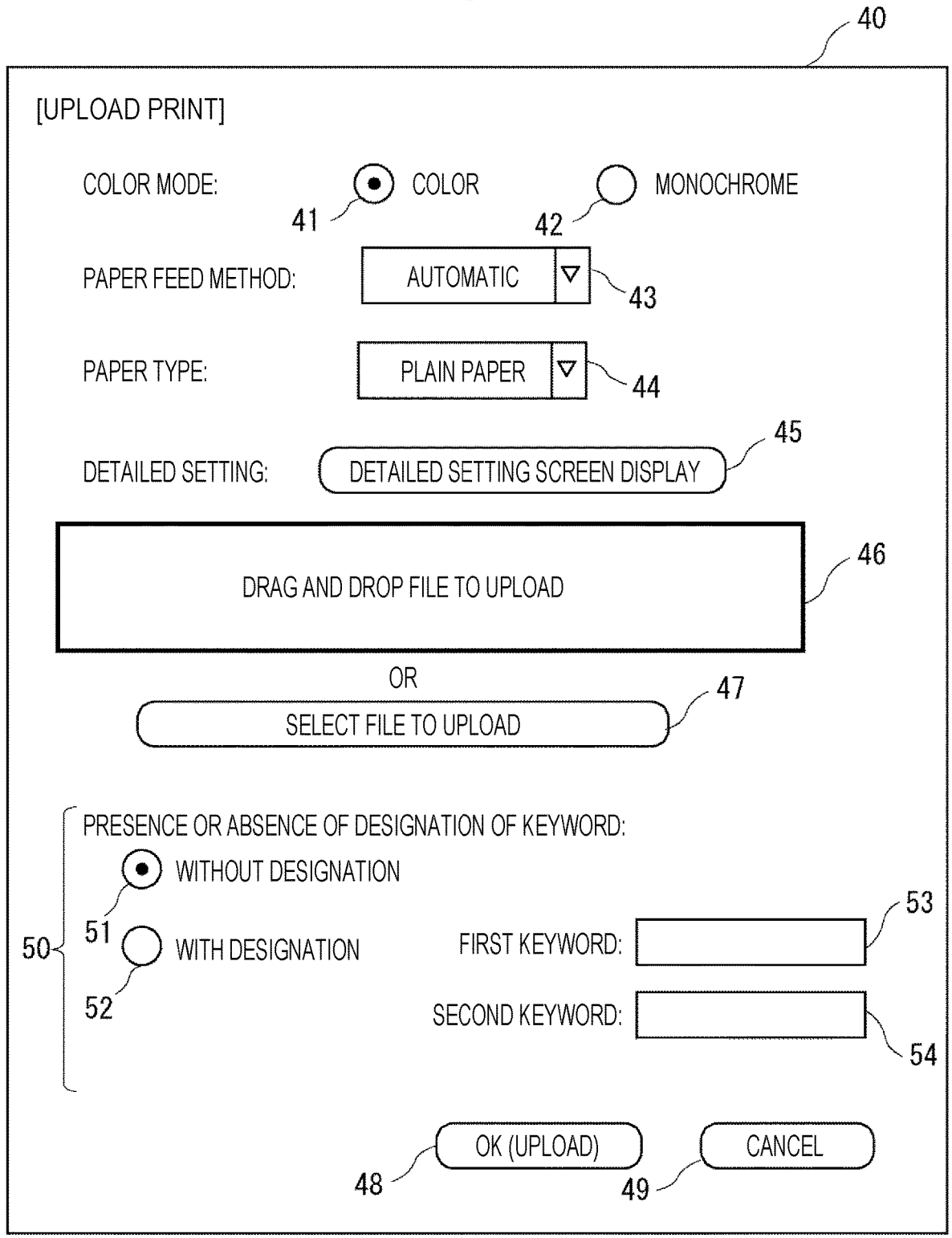
FIG. 4 is a schematic diagram showing an example of an operation image provided to a terminal device in the upload printing process of FIG. 3.
Figure 5:
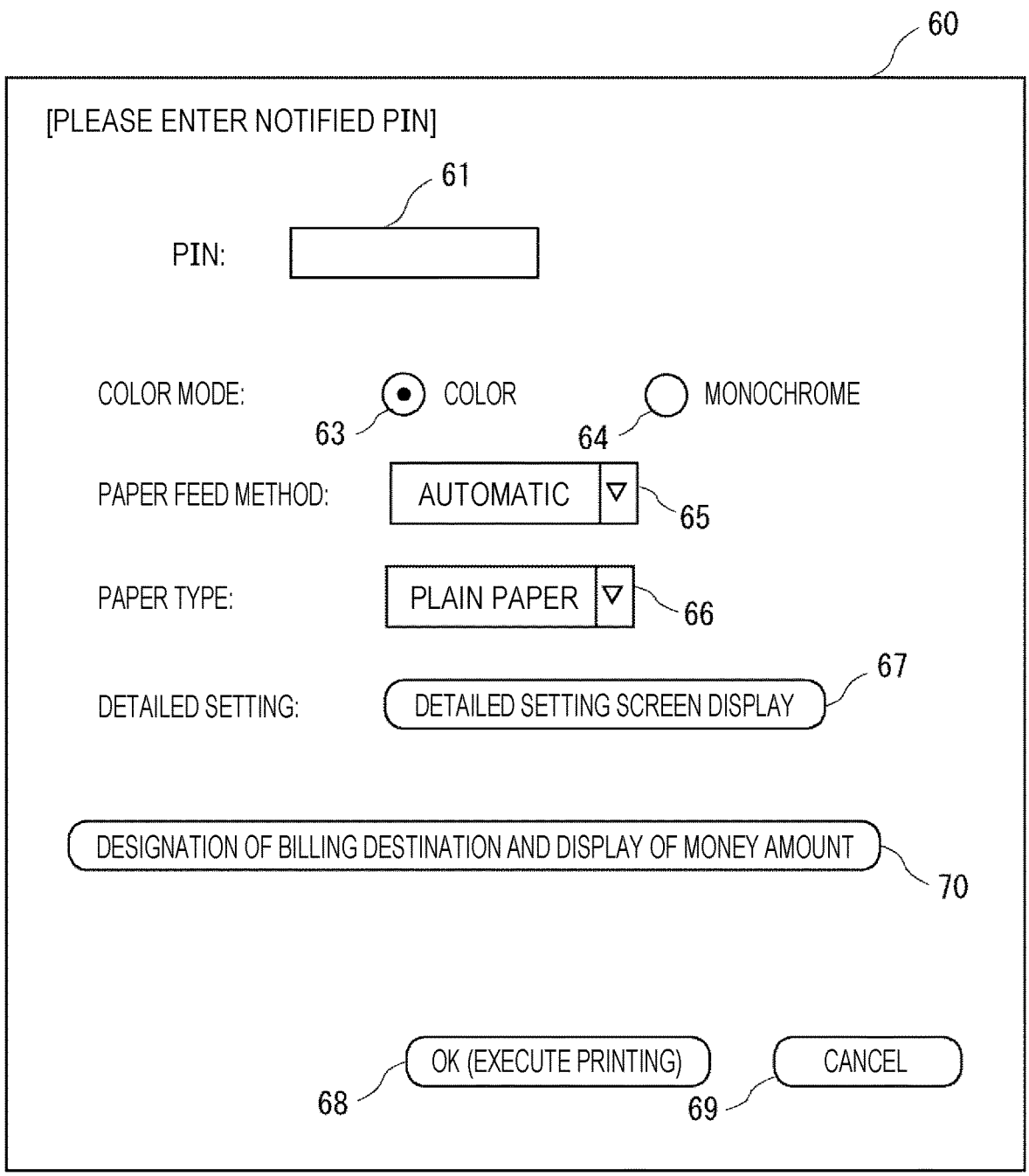
FIG. 5 is a schematic diagram showing an example of an operation image presented on the display unit of the image forming device in the upload printing process of FIG. 3.

Next, the first example of the upload printing process performed by the present system will be described with reference to FIGS. 3 to 5. The first example is an example of an image forming method when the user wants to print only one file to be printed. FIG. 3 is a flowchart for explaining the first example of the upload printing process executed by the image forming device 1. FIG. 4 is a schematic diagram showing an example of an operation image provided to the terminal device 3 in the upload printing process of FIG. 3. FIG. 5 is a schematic diagram showing an example of an operation image presented on the display unit 23 of the image forming device 1 in the upload printing process of FIG. 3, that is, an example of a main body operation image.

In the following first example, some operations are described with the terminal device 3 or the image forming device 1 as the main operation unit. It is clear from the description of the configuration given above that which part of the terminal device 3 or the image forming device 1 performs its operation. The same applies to the second example and the third example which will be described later. Further, the explanation of the billing timing is omitted in the first to third examples, and the billing timing is described separately following the third example.

First, the terminal device 3 reads the QR code 1e displayed on the image forming device 1 to acquire an address of the provider of the image forming device 1, and accesses the address to request the image forming device 1 to provide the operation image (step S11). The address of the provider can be acquired by reading the address acquired by reading the QR code 1e in the past.

The image forming device 1 that has received the provision request in step S11 provides the operation image by transmitting it to the terminal device 3 via the communication unit 25 (step S12). Here, description will be given assuming that an operation image 40 of FIG. 4 is provided. The terminal device 3 receives the operation image 40 and displays it on the display unit 33 (step S13).

The operation image 40 can include a color print designation button 41, a monochrome print designation button 42, a pull-down menu 43 for selecting a paper feed method, a pull-down menu 44 for selecting a paper type, and a detailed setting screen display button 45 regarding print settings. Although the color print designation button 41 and the monochrome print designation button 42 are radio buttons as an example, they are not limited to this, and buttons for another operation images and a main body operation image are not limited to those described in the example. The detailed setting screen display button 45 is a button for newly displaying an operation image that is a screen for making more detailed print settings. When the user makes settings related to print settings, information related to the settings can be transmitted to the image forming device 1 when a file to be printed is transmitted.

The operation image 40 can include an area 46 for designating the first file to be printed by dragging and dropping, and a button 47 for displaying the image of the file management application software for selecting the first file to be printed. Of course, only one of the area 46 and the button 47 may be included.

The operation image 40 can include an OK button 48 for executing a process of uploading the first file to be printed to the image forming device 1 based on various pieces of information whose input is received by the operation image 40 and instructing to close the operation image 40, and a cancel button 49. The cancel button 49 is a button for closing the operation image 40 without executing the upload process or the like. The operation image 40 can include a keyword designation area 50 for designating a keyword used for generating the first identification information. Since the designation of this keyword will be described later as the third example, the keyword designation area 50 will be described later in the third example.

Here, an example of providing the operation image 40 in FIG. 4 as the operation image is described. However, the operation image to be provided is of course not limited to this example, and, in the first example, it is only required that designation of the first file to be printed is allowed and for example, the content related to the print setting and the content related to the keyword setting may not be included. In the second and third examples, which will be described later, it is only required that designation of a plurality of files to be printed is allowed.

After step S13, the terminal device 3 receives an operation of selecting the first file to be printed from the user through the operation unit 34 (step S14), and transmits the received first file to be printed to the image forming device 1 (step S15). Next, the image forming device 1 receives and acquires the first file to be printed from the terminal device 3 and generates the first identification information that is identification information for approving printing of the first file to be printed (step S16). The image forming device 1 stores, in the storage unit 22, the received first file to be printed and the generated first identification information in association with each other (step S17).

Next, the image forming device 1 notifies the terminal device 3 of the stored first identification information (step S18), and the terminal device 3 receives the first identification information and displays it on the display unit 33 (step S19).

After step S18, the image forming device 1 displays, on the display unit 23, a main body operation image for inputting identification information to set a state of receiving the input of the identification information from the operation unit 24 to receive the input from the user (step S20). The process of step S20 can be performed after waiting for a predetermined time required for performing displaying on the terminal device 3 after step S18. Alternatively, the process of step S20 can be performed after the user of the terminal device 3 performs an operation to perform the upload printing process from the operation menu displayed on the display unit 23 of the image forming device 1.

The main body operation image for inputting identification information can be, for example, a main body operation image 60 shown in FIG. 5. The main body operation image 60 can include an input field 61 for entering a PIN as identification information.

Further, the main body operation image 60 can include a color print designation button 63, a monochrome print designation button 64, and a pull-down menu 65 for selecting a paper feed method regarding print settings. Further, the main body operation image 60 can include a pull-down menu 66 for selecting the type of paper and a detailed setting screen display button 67 regarding print settings. At this time, it is possible to read various print settings that are transmitted from the terminal device 3 and designated in the operation image 40 of FIG. 4, and display content of the read print settings. In this case, the user can check the content of the print settings designated by the user and change them if necessary. Of course, the operation image 40 may not include the input of information about print settings, but in this case, the content of the default print settings may be displayed in the main body operation image 60.

Further, the main body operation image 60 can include an OK button 68 for proceeding to a process of acquiring approval of printing and executing printing based on various pieces of information whose input is received by the main body operation image 60, and instructing to close the main body operation image 60, and a cancel button 69. The cancel button 69 is a button for closing the main body operation image 60 without executing the process.

The main body operation image 60 may include a button 70 that designates, for example, the billing unit 26 or any of the other billing destinations designated in advance as the billing destination, and displays the amount of money calculated when executes printing of the first file to be printed with the current print settings. When the button 70 is selected by the user, the amount of money can be calculated and displayed on the display unit 23. Billing completion information may be acquired upon completion of billing, and information indicating the completion of billing may be displayed on the main body operation image 60 or the main body operation image displayed subsequently.

Next, the identification processing unit 18 of the image forming device 1 determines whether the identification information whose input is received in step S20 matches the first identification information (step S21). When the identification processing unit 18 determines in step S20 that the identification information whose input is received matches the first identification information, that is, when YES determination is made in step S21, the first file to be printed corresponding to the first identification information is identified, and the conversion processing unit 14 converts the first file to be printed into the first print data (step S22). In step S22, the printing unit 21 further prints the first print data on the medium, and the process ends. This medium can be supplied from the paper feed box 1*d*.

In the first example described with reference to FIG. 3, the conversion to the first print data is performed after step S21, but, for example, the conversion can be performed before or after any of the steps S16 to S20. For example, when the conversion is performed before step S17, it is possible to store the first print data and the first identification information in association with each other.

When billing is required, it is assumed that billing is performed at least before printing of the first print data is executed in step S22. However, the billing can be performed by having the user print out a receipt such as a bill specifying the amount of billing with the image forming device 1, hand it over to the store clerk at the place where the image forming device 1 is installed, and make the post settlement.

Effects of Present System

Before describing the second example, the third example, and the like, the effects of the present embodiment will be described. In the present embodiment, for example, the user does not need to install a printer driver or a dedicated application program in the terminal device 3 for converting the file to be printed into data in a format that can be printed by the printing unit 21. Therefore, according to the present embodiment, it is possible for the user to simplify the work required in the process of printing the file to be printed after approval by the image forming device 1, and to reduce the burden on the user.

In addition, in the present embodiment, since printing is not performed via a server, there is no need to prepare a server to provide this upload printing process service, it is possible to reduce costs required for the system installation and its operation, and to reduce costs of providing the service. Further, in the present embodiment, the process is simplified because the process does not go through the server. Therefore, according to the present embodiment, it is possible to construct in a simplified manner a system for performing the process necessary for a user to print a file to be printed after approval from the image forming device 1, and to simplify the process.

In this way, in the present system, it is possible to construct a system in which the terminal device 3 makes a request of the image forming device 1 for printing, and the printing can be perform after approval by the image forming device 1 as a system that requires just a simple process.

Second Example of Upload Printing Process by Present System

Figure 6:
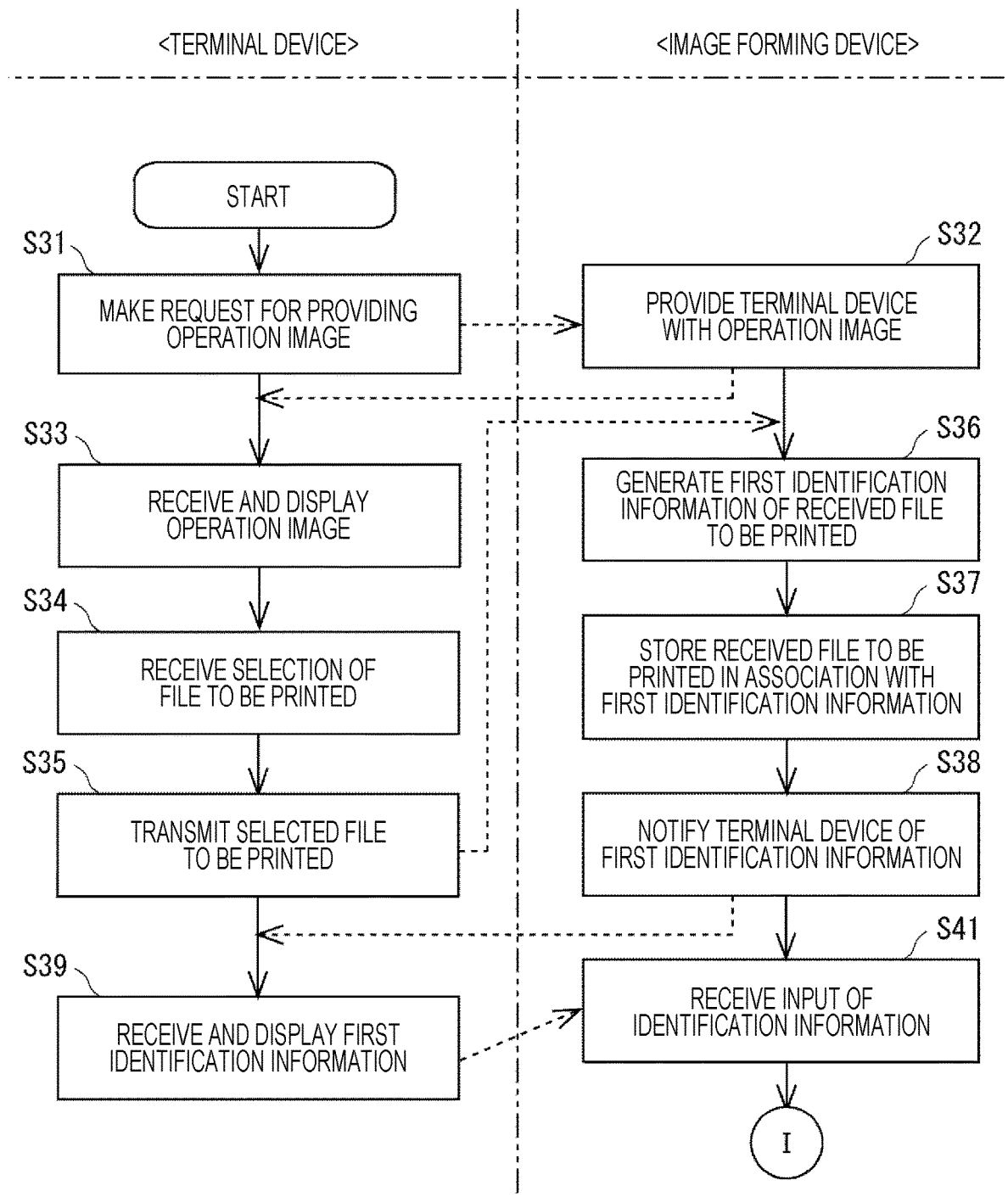
FIG. 6 is a flowchart for explaining a second example of an upload printing process executed by the image forming device of FIG. 1.
Figure 7:
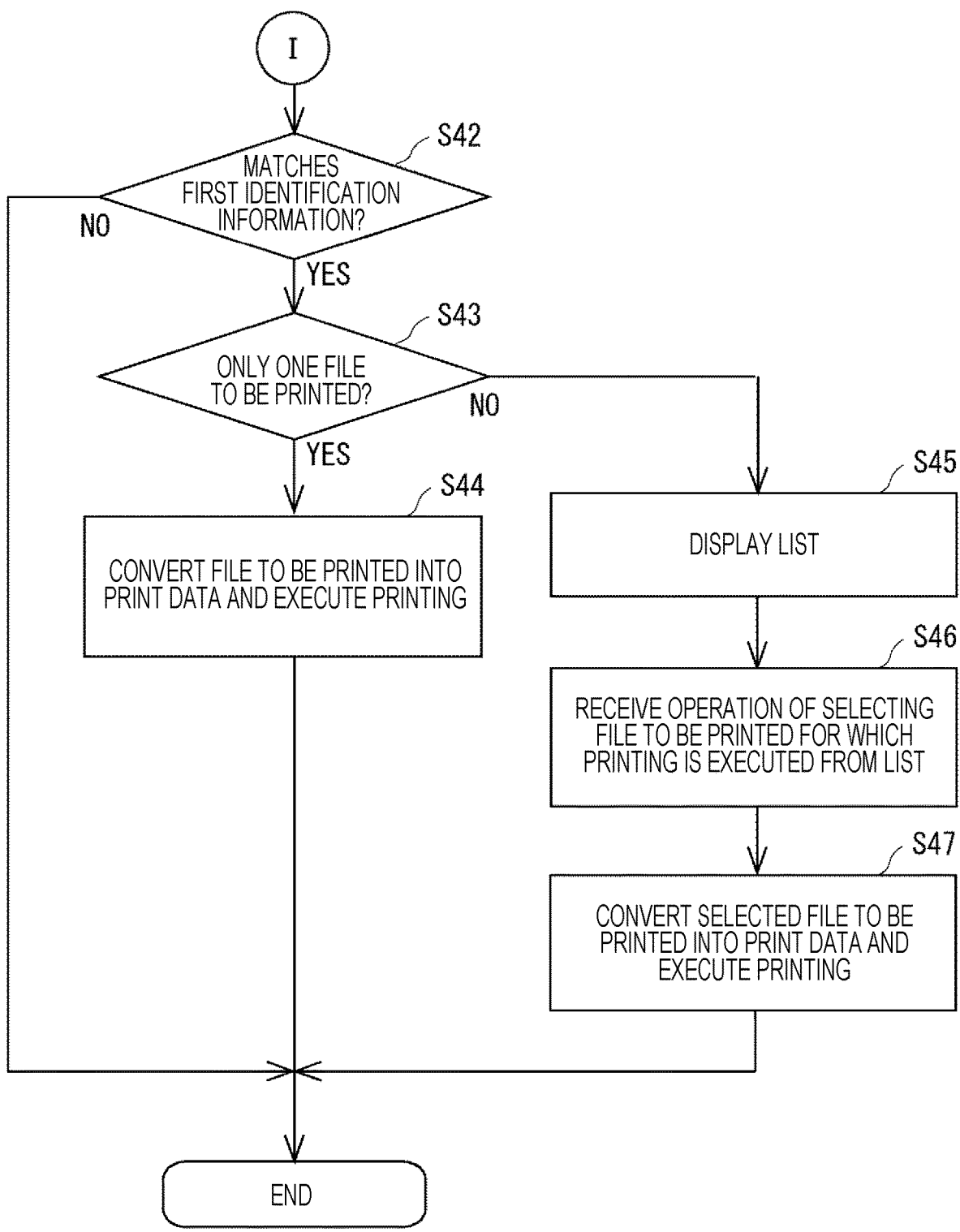
FIG. 7 is a flowchart following FIG. 6.
Figure 8:
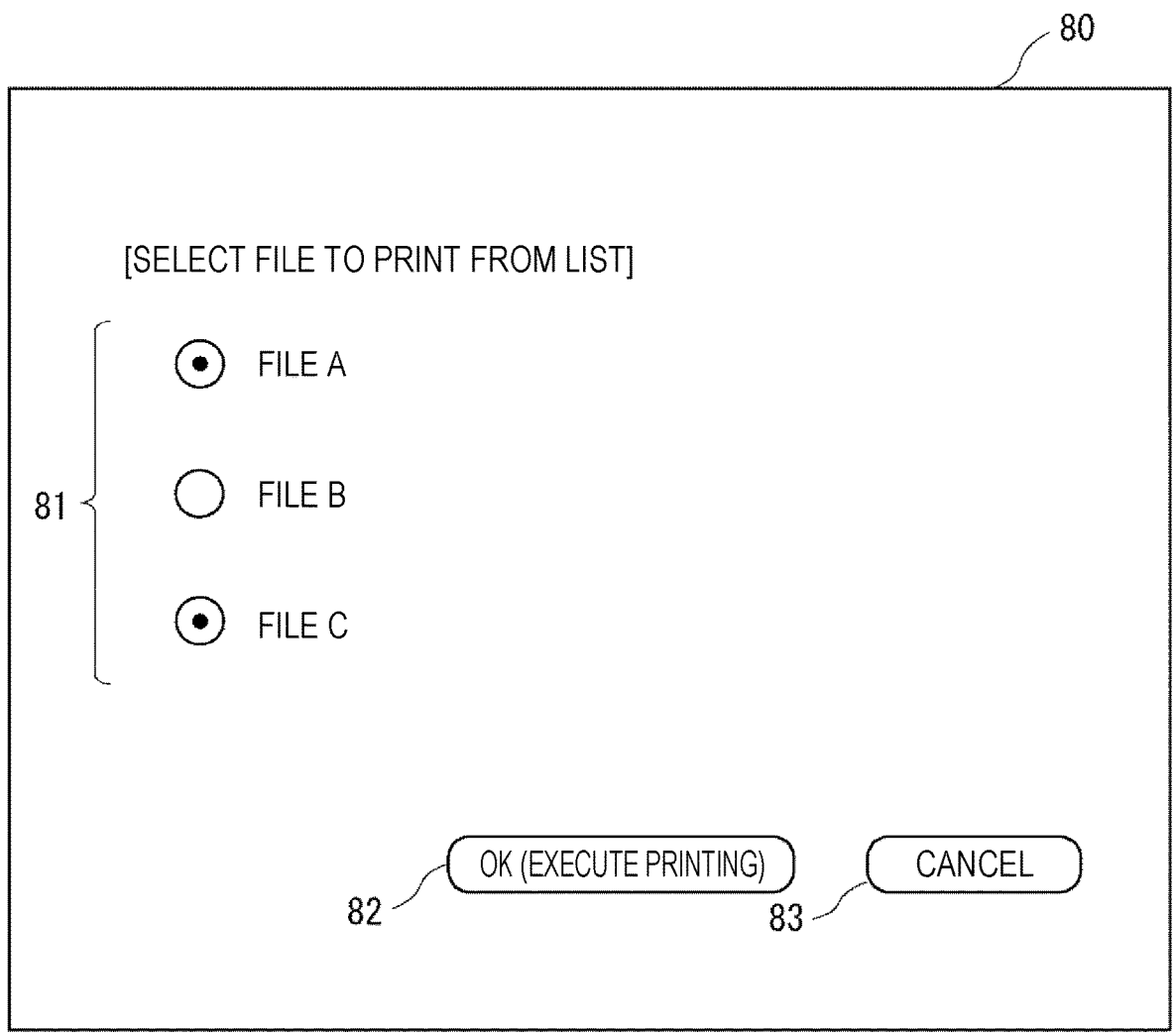
FIG. 8 is a schematic diagram showing an example of an operation image presented on the display unit of the image forming device in the upload printing process of FIGS. 6 and 7.

Next, the second example of the upload printing process performed by the present system will be described with reference to FIGS. 6 to 8. A second example is an example of an image forming method when the user wants to print a plurality of files to be printed. FIG. 6 is a flowchart for explaining the second example of the upload printing process executed by the image forming device 1, and FIG. 7 is a flowchart following FIG. 6. FIG. 8 is a schematic diagram showing an example of a main body operation image presented on the display unit 23 of the image forming device 1 in the upload printing process of FIGS. 6 and 7. In the following, for the sake of simplification of explanation, the explanation of the same parts as in the first example is partially omitted.

The second example is an example in which a plurality of files to be printed can be printed after approval using one piece of first identification information such as one PIN, so that the image forming device 1 is configured to perform the following control. This control is executed when the acquisition processing unit 12 acquires, from the terminal device 3, one or a plurality of second files to be printed each of which is a file to be printed different from the first file to be printed.

The storage processing unit 15 in the second example stores, in the storage unit 22, the second object to be printed that is either one of the second file to be printed and the second print data converted from the second file to be printed by the conversion processing unit 14 in association with the first identification information. Of course, the conversion processing unit 14 in the second example is configured to convert the second file to be printed into second print data that is data in a format printable by the printing unit 21.

Then, when the identification information whose input is received by the input processing unit 17 matches the first identification information, the identification processing unit 18 in the second example identifies the first object to be printed and the second object to be printed corresponding to the first identification information. The printing unit 21 in the second example executes printing of the first print data of the first object to be printed and the second print data of the second object to be printed identified by the identification processing unit 18.

The flow of the upload printing process in the second example will be described. First, the same processes as those described in steps S11 to S13 of FIG. 3 are executed (steps S31 to S33). After step S33, the terminal device 3 receives an operation of selecting a file to be printed from the user through the operation unit 34 (step S34), and transmits the received file to be printed to the image forming device 1 (step S35). Here, it is possible to select and transmit a plurality of files to be printed as files to be printed.

Next, the image forming device 1 receives and acquires one or a plurality of files to be printed transmitted from the terminal device 3, and generates the first identification information that is identification information for approving printing of the files to be printed (step S36). The image forming device 1 stores, in the storage unit 22, one or a plurality of received files to be printed and the generated first identification information in association with each other (step S37), and notifies the terminal device 3 of the stored first identification information (step S38). The terminal device 3 receives this first identification information and displays it on the display unit 33 (step S39).

After step S38, the image forming device 1 receives an input from the user (step S41) as in step S20. As in the first example, in the second example, the main body operation image for inputting identification information can be, for example, the main body operation image 60 shown in FIG. 5, and can include the input field 61 for entering a PIN.

Next, the identification processing unit 18 of the image forming device 1 determines whether the identification information whose input is received in step S41 matches the first identification information (step S42). When the identification processing unit 18 determines that the identification information whose input is received in step S41 matches the first identification information, that is, when YES determination is made in step S42, one or a plurality of files to be printed corresponding to the first identification information is identified, and determines whether the number of files to be printed is one (step S43).

When YES determination is made in step S43, as in step S22, the conversion processing unit 14 converts the file to be printed into print data and the printing unit 21 prints the print data on the medium (step S44).

On the other hand, when NO determination is made in step S43, the identification processing unit 18 displays a list of the received plurality of files to be printed on the display unit 23 (step S45). This list can be displayed as being included in a main body operation image 80 shown in FIG. 8, for example. The main body operation image 80 can include a list 81 of file names of files to be printed and buttons for selecting a file corresponding to each file name. The main body operation image 80 includes an OK button 82 for executing printing of a file to be printed having a file name input by selecting a button of the list 81, and for instructing to close the main body operation image 80, and a cancel button 83. The cancel button 83 is a button for closing the main body operation image 80 without executing printing.

Thus, when the identification information whose input is received by the input processing unit 17 matches the first identification information, the display unit 23 can display the list of objects to be print associated with the first identification information. Description is made assuming that the identification processing unit 18 executes the control for this display, but the control unit 10 may execute it. An example was given in which the list is displayed only when there is a plurality of files to be printed associated with the first identification information. However, even when there is only one file to be printed, it is possible to display a list of the one file to be printed and ask the user to determine whether to execute printing.

After step S45, the image forming device 1 receives from the operation unit 24 an operation of selecting a file to be printed of which printing is executed from the list (step S46). In this manner, the input processing unit 17 can receive from the operation unit 24 an operation of selecting an object to be executed printing of which is executed from the list. Although the process of step S46 can be executed by the input processing unit 17 in this manner, the present disclosure is not limited to this and the process may be executed by the control unit 10.

Next, the conversion processing unit 14 converts the one or a plurality of files to be printed selected in step S46 into print data, and the printing unit 21 prints the one or the plurality of pieces of print data on a medium (step S47) and end the process. In this manner, the printing unit 21 executes printing of the print data of the selected object to be executed.

Further, as described as the process of steps S46 and S47, when the operation unit 24 receives the operation of selecting an object to be executed, the printing unit 21 can execute printing of the print data of the object to be executed, while executing the next process described in S44. That is, when the first identification information is associated only with the first object to be printed in a case where the identification information whose input is received by the input processing unit 17 matches the first identification information, the printing unit 21 can start printing of the first print data of the first object to be printed.

As in the first example, in the second example described with reference to FIGS. 6 and 7, an example is described in which conversion to print data is performed immediately before executing printing, but the conversion may be performed before or after any of steps S36 to S38, and steps S41 to S42. For example, when the conversion is performed before step S37, it is possible to store the print data and the first identification information in association with each other.

When billing is required, it is assumed that billing is performed at least before the print data is printed in step S44 or S47. However, as described in the first example, billing can be performed by post-settlement.

First Modification of Second Example of Upload Printing Process by Present System On the other hand, in the second example, it is possible to adopt a procedure in which the determination in step S43 is not made, and printing of all the files to be printed associated with the first identification information is collectively executed regardless of whether the number of files to be printed is one or plural.

Second Modification of Second Example of Upload Printing Process by Present System In the second example, while a processing example in which a plurality of files to be printed is uploaded from the terminal device 3 is described, even when any one of or a plurality of files to be printed among a plurality of files to be printed is uploaded at different timings, the image forming device 1 can be configured to cope with the process.

Specifically, the control unit 10 of the image forming device 1 can store, in the storage unit 22, the first identification information associated with one or a plurality of files to be printed that is uploaded first and one or a plurality of files to be printed that is uploaded later in association with each other. That is, in this case, one or a plurality of files to be printed that is uploaded first and one or a plurality of files to be printed that is uploaded later are stored in association with the same first identification information.

As a configuration for this purpose, when receiving a file to be printed, the acquisition processing unit 12 determines whether the terminal device 3 and the acquisition source terminal device from which the received second file to be printed is acquired match in address information. For this purpose, it is preferable to store the address information in the storage unit 22 in association with the first identification information and the like. Then, when the files matches in address information, the acquisition processing unit 12 may determine that the second file to be printed has been acquired from the terminal device 3. Here, the address information includes, for example, a media access control (MAC) address, an internet protocol (IP) address, and the like. When the provision processing unit 11 instead of the acquisition processing unit 12 receives a request for providing the operation image, it may be determined whether there is a terminal device that is associated with the first identification information and whose address information matches that of the terminal device that requested the operation image.

As a processing procedure of this modification, for example, in the process of FIG. 6, it is preferable to add a process of determining whether the received files to be printed match in address information before step S36. Then, the processing procedure of this modification may be a processing procedure such that when the result of this determination is that they do not match, the process proceeds to step S36. In the processing procedure of this modification, in addition to that, when the files match in address information, the process may proceed to step S37. In this case, the received file to be printed may be stored in the storage unit 22 in association with the first identification information stored in the storage unit 22 in step S37.

In addition, in the processing procedure of this modification, when the files match in address information, the same first identification information is notified to the same terminal device 3 in step S38, so that the process in step S38 may be omitted, but may be notified again for the purpose of the user confirming. From the user's point of view, re-notification means that the same first identification information is issued.

In addition, in the case of the same re-notification, at the time of the notification, the notification can include the fact that the file to be printed is added in addition to the file to be printed that is uploaded first, and a list of files to be printed associated with the first identification information as displayed as the list 81. In this way, when making a notification of the first identification information, it is possible to include information indicating the transmitted file to be printed. In this regard, the same applies to the first example and the second example described in FIG. 6 and FIG. 7.

The address information associated with the first identification information may be stored only for a predetermined period after the generation of the first identification information. As a result, the scene in which it is determined that such address information matches is limited to within a predetermined period after the generation of the first identification information. Storing the address information for a predetermined period means that it is assumed that the user does not stay at the installation location of the image forming device 1 for a long time, and this predetermined period is generally set to a period during which the user is likely to stay at the installation location.

It is possible to manage the process with a user name instead of address information. In both the example in which the predetermined period is set and the example in which the predetermined period is not set, the first identification information can be deleted together with the associated object to be printed after printing is executed. In this regard, the same applies to the first example, the second example described in FIG. 6 and FIG. 7 and the first modification. By deleting the first identification information after printing, it is possible to add more files to be printed before printing is executed.

Additional Effects of Second Example of Present System

The second example and the first and second modifications thereof exhibit the effects described as the effects of the present system, but in addition to this, they exhibit the effect of being able to collectively print a plurality of files to be printed. Further, according to the second example, when the number of files to be printed received by the image forming device 1 is one, the printing unit 21 automatically starts printing, and when the number of files to be printed is plural, it is possible to display the list and ask the user to choose a file. In addition, according to the second modification, since the user does not need to transmit the files to be printed at once, the effects in which the user can later add the file to be printed that the user has forgotten to transmit and execute printing of them are exhibited.

Third Example of Upload Printing Process by Present System

Figure 9:
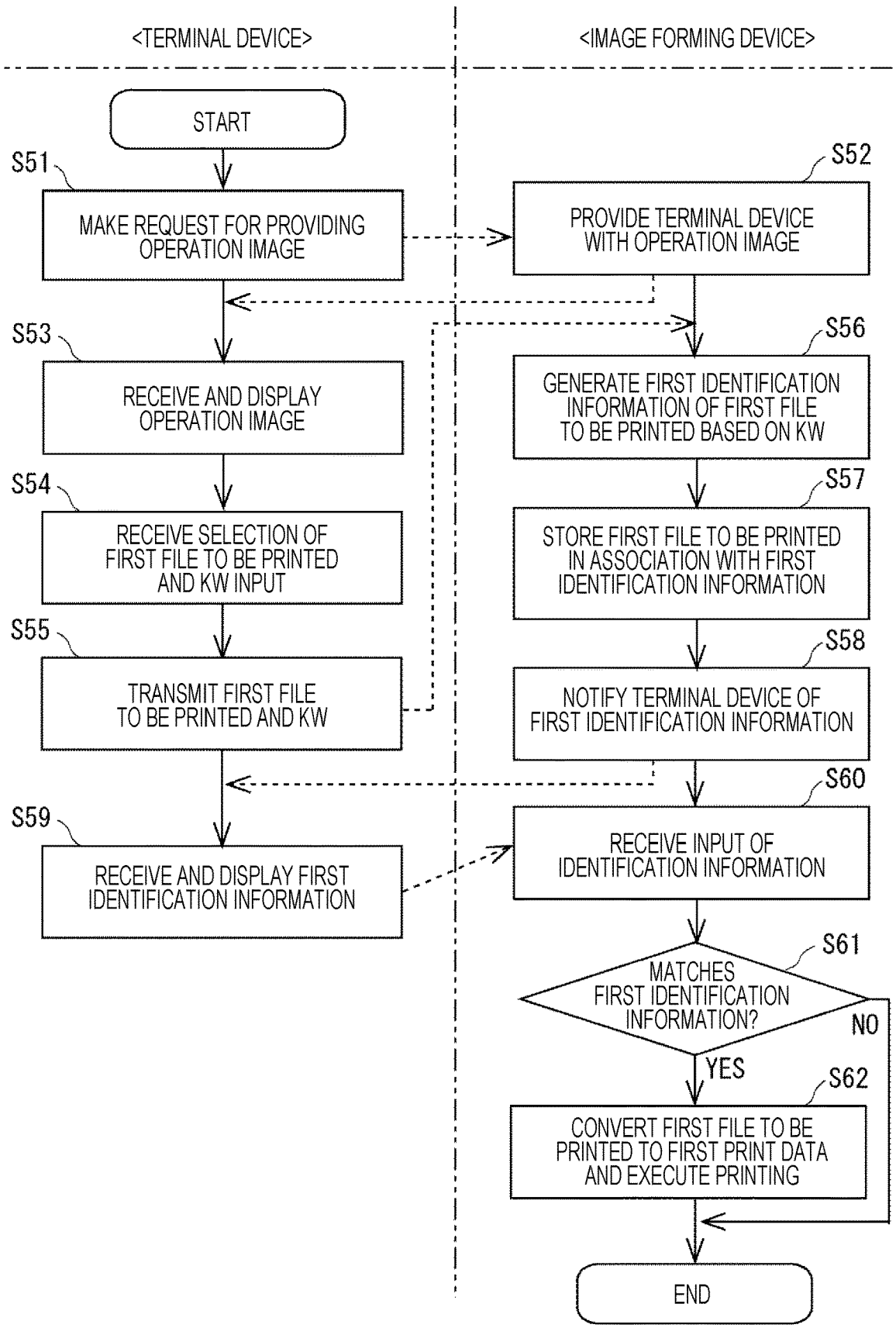
FIG. 9 is a flowchart for explaining a third example of an upload printing process executed by the image forming device of FIG. 1.

Next, the third example of the upload printing process performed by the present system will be described with reference to FIG. 9. The third example is an example of an image forming method in which the user wants to print a plurality of files to be printed and designates a keyword. FIG. 9 is a flowchart for explaining the third example of the upload printing process executed by the image forming device 1.

The third example is an example in which the keyword input from the terminal device 3 is used when the generation processing unit 13 generates the first identification information, and the same applies to any the first example and the second example, and the first and second modifications thereof. In the following, for the sake of simplification of explanation, basically only the example applied to the first example will be given, and the explanation of the same parts as the first example will be partly omitted.

The acquisition processing unit 12 in the third example acquires a keyword from the terminal device 3 via the communication unit 25 together with or before or after the acquisition of the first file to be printed. As shown in FIG. 4, the operation image 40 can include the keyword designation area 50 for designating a keyword used for generating the first identification information.

The keyword designation area 50 can include a button 51 and a button 52 for selecting presence or absence of designation of the keyword, an input field 53 for inputting a first keyword, and an input field 54 for inputting a second keyword. Further, although not shown, in the keyword designation area 50, when restrictions on character strings, numerals, symbols, or the number of characters to be designated as a keyword are provided, a sentence indicating such restrictions can be displayed.

Here, an example of inputting two keywords is given, but three or more keywords can be input. In either case, it is possible to prevent the keywords designated by a plurality of users from overlapping, that is, from competing with each other. Of course, only one keyword can be input. It is preferable that the image forming device 1 sets the minimum number of characters to be large to a certain extent so that keywords designated by a plurality of users do not overlap.

Then, the generation processing unit 13 in the third example generates the first identification information based on the keyword acquired from the terminal device 3. In the simplest example, the generation processing unit 13 can use the keyword itself acquired from the terminal device 3 as the first identification information. Further, when requesting the input of a plurality of keywords, such as when requesting the input of two keywords as in the operation image 40, the generation processing unit 13 connects the keywords in the order of the input fields, and uses the connected keywords as the first identification information. Alternatively, the generation processing unit 13 can change the order of the keywords input in the input fields according to a predetermined rule or randomly, connect them, and use them as the first identification information. Of course, the generation processing unit 13 can generate the first identification information based on one or a plurality of input keywords so as to include the input keywords or change them to completely different information based on a predetermined rule.

The flow of the upload printing process in the third example will be described. First, the same processes as those described in steps S11 to S13 of FIG. 3 are executed (steps S51 to S53). However, it is assumed that the operation image displayed here includes the keyword designation area 50 as in the operation image 40. After step S53, the terminal device 3 receives an operation of selecting a file to be printed and an input of a keyword (KW) from the user on the operation unit 34 (step S54), and transmits the received file to be printed and the keyword to the image forming device 1 (step S55).

Next, the image forming device 1 receives and acquires the first file to be printed transmitted from the terminal device 3, and generates the first identification information that is identification information for approving printing of the first file to be printed based on the received keyword (step S56). In the subsequent process, the process similar to steps S17 to S22 in FIG. 3 is executed as steps S57 to S62.

Further, when the third example is applied to the second example, an example of a condition under which the same first identification number is issued includes a case where the keywords designated at the time of upload match. Naturally, when the keywords are different, the first identification information will be different. Therefore, the different first identification information will be determined not to be an object to be printed simultaneously, and printing is performed individually.

Additional Effects of Third Example of the Present System

The third example exhibits the effects described as the effects of the present system, and when applied to the second example, it exhibits the effects described in the second example, but in addition to this, it exhibits the following effects. That is, according to the third example, the user can designate the keyword. Specifically, in the third example, the generation processing unit 13 generates the first identification information with the keyword as it is or the keyword included, thereby reducing the possibility of the user erroneously inputting the identification information into the image forming device 1.

Example of Billing Timing in Upload Printing Process by Present System

Examples of billing timing in the present system will be described based on the first to third examples described above.

In any of the first to third examples, the printing unit 21 can execute printing when the billing processing unit 19 acquires billing completion information. Specifically, the billing processing unit 19 can determine whether to execute printing by acquiring the billing completion information corresponding to the first identification information as described above. In the first example, the second example, and the third example, when the billing completion information is acquired before step S22, step S44 or S47, and step S62, respectively, printing is executed.

On the other hand, the control unit 10 can include a consideration request unit (not shown) that makes a notification urging a payment of the consideration when the billing processing unit 19 has not acquired the billing completion information. This consideration request unit can include the communication unit 25 that makes a notification and the billing processing unit 19. In this case, the billing processing unit 19 calculates the notification details including the instruction of the notification and the amount of money. When this notification is made, the printing unit 21 can hold printing, and may execute printing when the billing completion information is acquired.

Further, as described above, the notification processing unit 16 notifies the terminal device 3 via the communication unit 25 of the first identification information stored in the storage unit 22, and the notification may be made when the billing processing unit 19 acquires the billing completion information. In the first example, the second example, and the third example, the notifications in steps S18, S38, and S58, respectively, are made on the condition that the billing completion information has been acquired.

The billing processing unit 19 can acquire the billing completion information after notifying the terminal device 3 of the first identification information. In the first example, the second example, and the third example, the billing completion information is acquired after the notification in steps S18, S38, and S58, respectively. Then, the printing unit 21 executes printing when the identification processing unit 18 identifies the first object to be printed and the billing processing unit 19 acquires the billing completion information.

In addition, after the terminal device 3 uploads the file to be printed to the image forming device 1, the billing processing unit 19 displays a link to the electronic settlement system on the display unit 33 of the terminal device 3 or the display unit 23 of the image forming device 1. When the link is displayed on the display unit 33, the billing processing unit 19 can instruct the provision processing unit 11 to display the link in the operation image. In the first example, the second example, and the third example, after the image forming device 1 receives the file to be printed in response to the transmission process in steps S15, S35, and S55, respectively, the link to the electronic settlement system will be displayed. In this case, the first identification information will be received after billing from this link is completed.

Other Modifications

The present disclosure is not limited to the above embodiments, and can be modified as appropriate without departing from the scope of the disclosure. For example, the image forming device according to the present embodiment does not include some of the constituent elements of the image forming device 1 shown in FIG. 1 as can be seen from the content exemplified in the first to third examples. Further, the image forming device according to the present embodiment can be widely applied to a copier, a facsimile, a multifunction machine having these functions, and the like.

Figure 10:
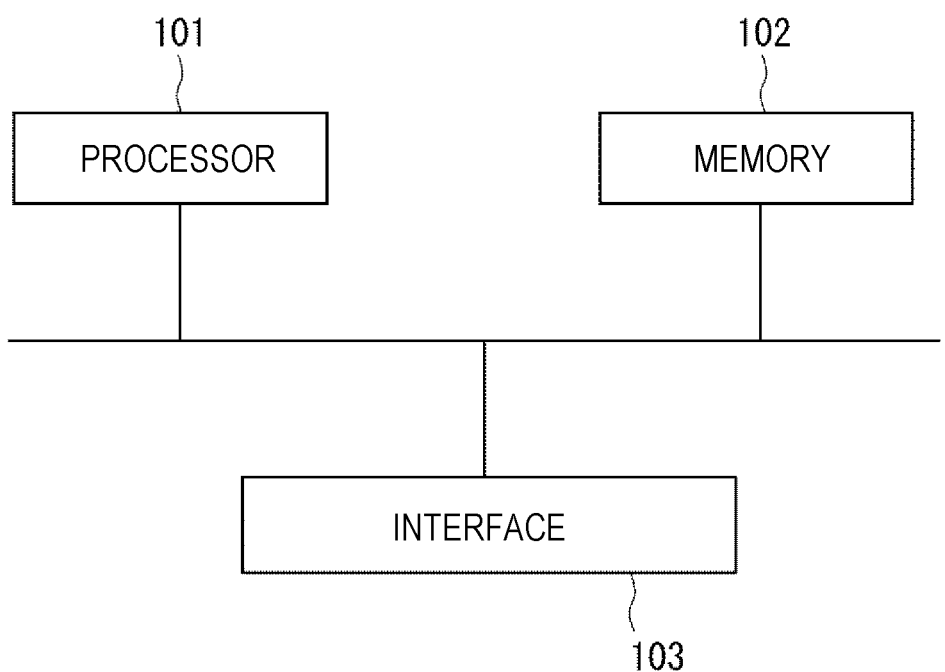
FIG. 10 is a diagram showing an example of the hardware configuration of the device.

Further, each device included in the image forming system according to the above-described embodiment can have, for example, the following hardware configuration. FIG. 10 is a diagram showing an example of the hardware configuration of the device.

The device 100 shown in FIG. 10 can include a processor 101, a memory 102 and an interface 103. The interface 103 can include, for example, a communication interface, an interface with a drive unit, a sensor, an input/output device, and the like, which are necessary depending on the device.

The processor 101 may be, for example, a CPU, a graphics processing unit (GPU), a micro processor unit (MPU) also referred to as a microprocessor, or the like. The processor 101 may include a plurality of processors. The memory 102 is configured by, for example, a combination of a volatile memory and a nonvolatile memory. The functions of each device are implemented by the processor 101 reading a program stored in the memory 102 and executing the program while exchanging necessary information via the interface 103.

The program described above includes an instruction group (or software code) that, when read into a computer, cause the computer to perform one or more of the functions described in the present embodiments. The program may be stored in a non-transitory computer-readable medium or a tangible storage medium. By way of example and not limitation, the computer-readable medium or the tangible storage medium may include a random-access memory (RAM), a read-only memory (ROM), a flash memory, a solid-state drive (SSD), or another memory technology. By way of example and not limitation, the computer-readable medium or the tangible storage medium may include a CD-ROM, a digital versatile disc (DVD), a Blu-ray (registered trademark) disc or another optical disc storage, a magnetic cassette, a magnetic tape, and a magnetic disk storage or another magnetic storage device. The program may be transmitted on the transitory computer-readable medium or the communication medium. By way of example and not limitation, the transitory computer-readable medium or the communication medium includes electrical, optical, acoustic, or other forms of propagated signals.

As described above, the present disclosure is described in accordance with the above embodiments, but the present disclosure is not limited only to the configurations of the above embodiments, and, of course, includes various variations, modifications, and combinations that a person skilled in the art could make within the scope of the disclosure of the claims of the present application.

What is claimed is:

1. An image forming device comprising:
   a providing unit that provides a terminal device with an operation image;
   an acquisition unit that acquires a first file to be printed from the terminal device;
   a generation unit that generates first identification information that is identification information for approving printing of the first file to be printed;
   a conversion unit that converts the first file to be printed into first print data;
   a storage unit that stores a first object to be printed that is either one of the first file to be printed and the first print data, and the first identification information in association with each other;
   a notification unit that notifies the terminal device of the first identification information stored in the storage unit;
   an input unit that receives input of second identification information;
   an identification unit that identifies the first object to be printed corresponding to the first identification information when the second identification information whose input is received by the input unit matches the first identification information; and
   a printing unit that executes printing of the first print data of the first object to be printed identified by the identification unit.

2. The image forming device according to claim 1, wherein
   when the acquisition unit acquires from the terminal device at least one second file to be printed each of which is a file to be printed different from the first file to be printed,
   the storage unit stores a second object to be printed that is either one of the at least one second file to be printed and second print data converted from the at least one second file to be printed by the conversion unit in association with the first identification information,
   the identification unit identifies the first object to be printed and the second object to be printed corresponding to the first identification information when the second identification information whose input is received by the input unit matches the first identification information, and
   the printing unit executes printing of the first print data of the first object to be printed and the second print data of the second object to be printed identified by the identification unit.

3. The image forming device according to claim 2, wherein the acquisition unit determines that the at least one second file to be printed is acquired from the terminal device when the terminal device and an acquisition source terminal device from which the at least one second file to be printed is acquired matches in address information.

4. The image forming device according to claim 1,
   wherein the acquisition unit acquires a keyword from the terminal device, and
   wherein the generation unit generates the first identification information based on the keyword acquired from the terminal device.

5. The image forming device according to claim 2, further comprising:
   a display unit that displays a list of objects to be printed associated with the first identification information when the second identification information whose input is received by the input unit matches the first identification information; and
   an operation unit that receives an operation of selecting an object to be executed printing of which is executed from the list, wherein
   the printing unit executes printing of print data of the object to be executed.

6. The image forming device according to claim 2, further comprising:
   a display unit that displays a list of objects to be printed associated with the first identification information when the first identification information is associated with the first object to be printed and the second object to be printed in a case where the second identification information whose input is received by the input unit matches the first identification information; and an operation unit that receives an operation of selecting an object to be executed printing of which is executed from the list, wherein the printing unit executes printing of print data of the object to be executed when the operation unit receives the operation of selecting the object to be executed, and starts printing of the first print data of the first object to be printed when the first identification information is associated only with the first object to be printed in a case where the second identification information whose input is received by the input unit matches the first identification information.

7. The image forming device according to claim 1, further comprising:

a billing information acquisition unit that acquires billing completion information indicating that a consideration for printing corresponding to the first identification information is charged, wherein the printing unit executes printing when the billing information acquisition unit acquires the billing completion information.

8. The image forming device according to claim 7, further comprising:

a consideration request unit that makes a notification urging a payment of the consideration when the billing information acquisition unit does not acquire the billing completion information.

9. The image forming device according to claim 1, further comprising:

a billing information acquisition unit that acquires billing completion information indicating that a consideration for printing corresponding to the first identification information is charged, wherein the notification unit notifies the terminal device of the first identification information when the billing information acquisition unit acquires the billing completion information.

10. The image forming device according to claim 1, further comprising:

a billing information acquisition unit that acquires billing completion information indicating that a consideration for printing corresponding to the first identification information is charged after the notification unit notifies the terminal device of the first identification information, wherein the printing unit executes printing when the identification unit identifies the first object to be printed and the billing information acquisition unit acquires the billing completion information.

11. An image forming method comprising:

in the image forming device;

providing a terminal device with an operation image;

acquiring a first file to be printed from the terminal device;

generating first identification information that is identification information for approving printing of the first file to be printed;

converting the first file to be printed into first print data;

storing a first object to be printed that is either one of the first file to be printed and the first print data, and the first identification information in association with each other;

notifying the terminal device of the first identification information stored;

receiving input of second identification information;

identifying the first object to be printed corresponding to the first identification information when the second identification information whose input is received matches the first identification information; and executing printing of the first print data of the first object to be printed identified.

12. A non-transitory computer-readable storage medium having stored thereon, computer-executable instructions which, when executed by a computer included in an image forming device, cause the computer to execute operations, the operations comprising:

providing a terminal device with an operation image;

acquiring a first file to be printed from the terminal device;

generating first identification information that is identification information for approving printing of the first file to be printed;

converting the first file to be printed into first print data;

storing a first object to be printed that is either one of the first file to be printed and the first print data, and the first identification information in association with each other;

notifying the terminal device of the first identification information stored;

receiving input of second identification information;

identifying the first object to be printed corresponding to the first identification information when the second identification information whose input is received matches the first identification information; and executing printing of the first print data of the first object to be printed identified.

* * * * *